United States Patent [19]

Quinn et al.

[11] Patent Number: 5,385,434
[45] Date of Patent: Jan. 31, 1995

[54] ELECTRICAL CONNECTOR DELIVERY SYSTEM

[75] Inventors: Robert L. Quinn; Edwin W. Parkinson; James R. Pelletier, all of St. Petersburg, Fla.

[73] Assignee: Molex Incorporated, Lisle, Ill.

[21] Appl. No.: 190,717

[22] Filed: Feb. 1, 1994

Related U.S. Application Data

[63] Continuation of Ser. No. 988,965, Dec. 9, 1992, abandoned.

[51] Int. Cl.⁶ .................................................. B65G 51/02
[52] U.S. Cl. ......................................... 406/73; 406/151; 406/153; 406/194; 406/195; 198/399; 221/173; 221/278
[58] Field of Search .................. 193/46; 198/389, 399; 221/171, 173, 236, 239, 278, 294; 406/73, 76, 87, 134, 147, 148, 149, 150, 176, 180, 191, 192, 194, 195, 151, 153

[56] References Cited

U.S. PATENT DOCUMENTS

| | | | |
|---|---|---|---|
| 3,016,774 | 1/1962 | Minobe | 198/389 X |
| 3,266,613 | 8/1966 | Grafius | 198/389 |
| 3,275,191 | 9/1966 | MacDonald | 221/236 X |
| 3,339,799 | 9/1967 | Spisak | 221/278 X |
| 3,397,015 | 8/1968 | Brosene, Jr. | 406/134 |
| 3,474,890 | 10/1969 | Center | 198/389 |
| 4,101,054 | 7/1978 | Frost et al. | 221/278 |
| 4,489,589 | 12/1984 | Kirsinas et al. | 221/236 X |
| 4,720,215 | 1/1988 | Arena | 221/278 X |
| 4,828,142 | 5/1989 | McKnight | 221/171 |
| 5,015,127 | 5/1991 | Hockman | 406/192 |

FOREIGN PATENT DOCUMENTS

| | | | |
|---|---|---|---|
| 61214 | 5/1981 | Japan | 193/46 |
| 204217 | 8/1990 | Japan | 406/194 |
| 8622 | 1/1991 | Japan | 406/148 |
| 8623 | 1/1991 | Japan | 406/148 |
| 1237370 | 6/1986 | U.S.S.R. | 198/399 |
| 1579713 | 7/1990 | U.S.S.R. | 406/147 |

*Primary Examiner*—David M. Mitchell
*Assistant Examiner*—Andrew C. Pike
*Attorney, Agent, or Firm*—Stacey E. Caldwell

[57] ABSTRACT

A connector delivery system delivers an electrical connector component from a storage container to a processing station regardless of the relative orientation of the storage container to the processing station. The storage container contains a plurality of the connector components. A delivery conduit communicates between the storage container and the processing station. An air jet is located within the delivery conduit for effecting a pressure differential therewithin to create a vacuum to cause movement of the connector components in the delivery conduit in a downstream direction from the storage container to the processing station without the use of gravitational forces. A selector pawl upstream of the air jet feeds the connector components through the delivery conduit one component at a time in an incremental fashion. An orientation track between the selector pawl and the air jet is effective to deliver the connector components in a predetermined orientation.

14 Claims, 3 Drawing Sheets

ELECTRICAL CONNECTOR DELIVERY SYSTEM

This is a continuation of copending application Ser. No. 07/988,065, filed on Dec. 9, 1992, now abandoned.

FIELD OF THE INVENTION

This invention generally relates to the art of electrical connectors and, particularly, to a delivery system for delivering electrical connector components to an appropriate tool or machine at a terminating or assembly station.

BACKGROUND OF THE INVENTION

Tools or machines which are used in the assembly and/or termination of electrical connectors are provided in a myriad of configurations, most of which are extremely complicated. Mechanical systems utilize complex linkages, cams and other mechanical devices, all of which must be precisely timed. Mechanical systems physically contact the connectors or components and can jam or damage the connectors or components themselves. Pneumatic systems have been used to a limited extent, such as in transmitting or installing extraneous components to connector assemblies, such as in the automatic cable tie installation tool disclosed and claimed in U.S. Pat. No. 3,976,108.

One of the problem areas in tools or machines or the character described is in the delivery of a connector or connector component from a supply thereof to an assembly or termination tool. Generally, in order to automatically deliver a connector component to a terminating station, a storage container or feeder bowl and a track must orient and carry the connector component to the terminating station. Such mechanisms have not been totally satisfactory for a number of reasons. First, a feeder bowl operates primarily on gravity which requires that the bowl be located above or at a prescribed location. In addition, such feeder bowls are expensive, noisy and bulky. Furthermore, feeder bowls and tracks generally are operated separately or independently from the terminating stations, and an operator must attempt to manage both mechanisms simultaneously. Still further, if a connector component occludes the track or gets jammed in the feeder bowl, an operator must determine the location of the occlusion or blockage and interrupt the terminating process. If an operator decides to shut-off the operation of the feeder bowl, it must be done separately and deliberately. There is a need for a delivery system which is simple, trouble free and which is easily operable from a remote location, such as from a terminating station. This invention is directed to satisfying that need and solving the various problems identified above.

SUMMARY OF THE INVENTION

An object, therefore, of the invention is to provide a new and improved delivery system for delivering connectors or connector components from a supply thereof to a processing station, such as to a terminating station.

In the exemplary embodiment of the invention, the delivery system includes a storage container for containing a plurality of connector components. A delivery conduit communicates between the storage container and the processing station. Delivery means are located within the delivery conduit for effecting a pressure differential therewithin to create a vacuum to cause movement of the connector components in the delivery conduit in a downstream direction from the storage container to the processing station regardless of the relative orientation of the storage container to the processing station. Therefore, the connector components are not physically engaged by mechanical moving devices and are moved through the delivery conduit without the use of gravitational forces.

More particularly, the delivery means is provided by a high pressure air jet in the conduit oriented in the downstream direction. The conduit is transversely dimensioned to allow only one connector component to pass therethrough at any given time.

A feature of the invention is the provision of feed means in the conduit for feeding connector components through the conduit one component at a time in an incremental fashion. The feed means is located upstream of the delivery means. The feed means is provided by a selector pawl for allowing a given connector component to pass thereby while blocking a successive connector component. Actuating means for the selector pawl is operatively associated with a tool at the processing station for cyclically actuating the selector pawl in response to operation of the tool.

Another feature of the invention is an orientation means associated with the conduit for effecting delivery of the connector components in a predetermined orientation. Specifically, the connector components may include large dimensioned ends and small dimensioned ends. The orientation means is provided by an orientation track extending along a section of the conduit and in communication therewith. The orientation track has a slot that is wider than the small dimensioned end of a connector component but smaller than the large dimensioned end of the connector component. Therefore, the small dimensioned end of a connector component enters the track and the vacuum is effective to draw the large dimensioned end of the connector component downstream through the conduit ahead of the small dimensioned end thereof. The orientation track is located upstream of the delivery means at a bend in the conduit, in a leading wall thereof.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
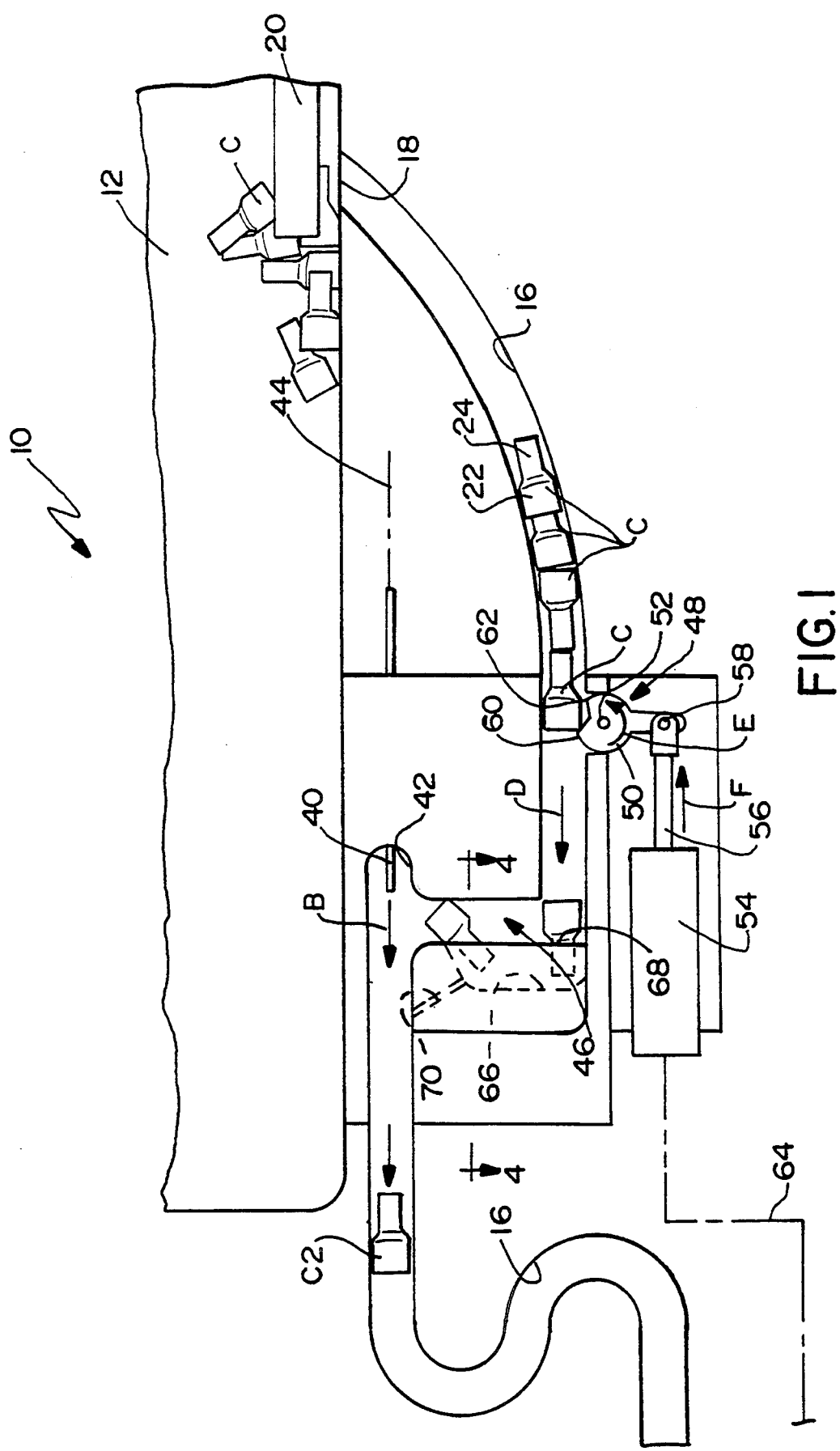
FIG. 1 is a schematic illustration of the connector delivery system of the invention.

Referring to the drawings in greater detail, the invention is directed to a connector delivery system, generally designated 10 (FIG. 1) for delivering an electrical connector component from a storage container 12 to a processing station, generally designated 14 (FIG. 2) without the use of gravitational forces. The storage container contains a plurality of connector components, and a delivery conduit 16 communicates between storage container 12 and processing station 14. Connector components "C" are shown at various points within and along conduit 16, including a connector component C1 located at processing station 14 (FIG. 2).

Storage container 12 is provided in the form of a hopper into which connector components are loaded or dumped. The hopper has an opening 18 in the bottom thereof from which the connector components exit into conduit 16. An agitator, schematically illustrated at 20, is provided in the hopper at opening 18 to prevent jamming and for facilitating entry of the connector components into the conduit. Various agitators and hopper configurations are contemplated, such as a funnel or rectangular-shaped hopper with a rubber wiping finger to prevent jamming at the point where the connector components move from the hopper into the conduit.

Figure 2:
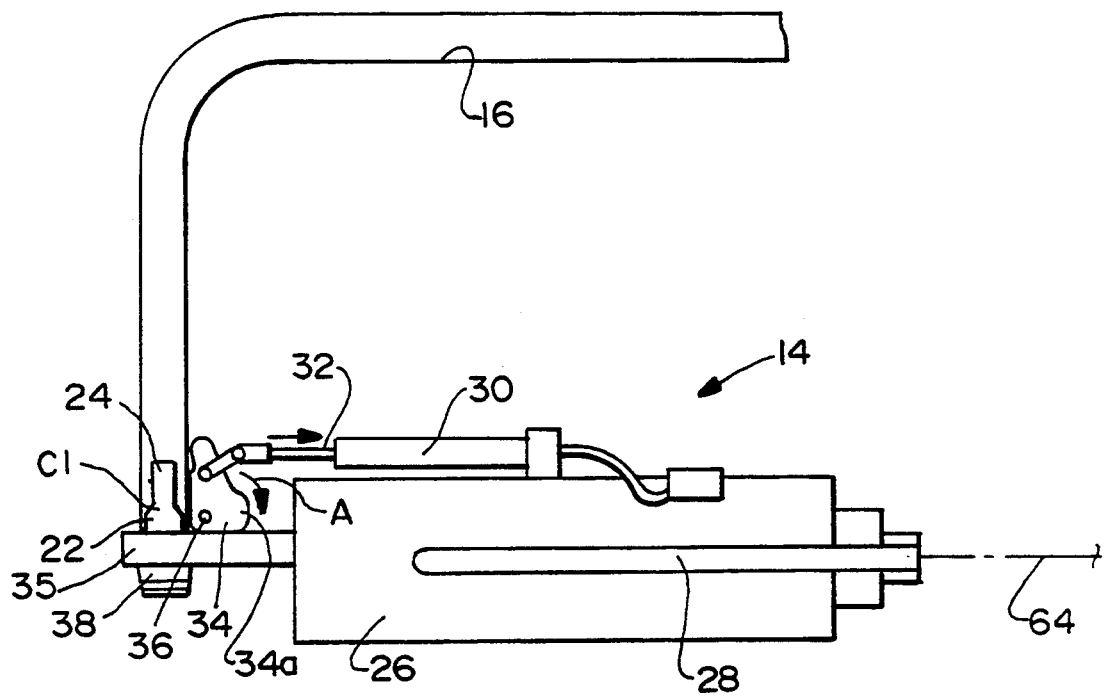
FIG. 2 is a schematic illustration of a termination tool operatively associated with the delivery system.

Connector components "C" are shown herein as ferrule-like connectors, known in the industry, having large dimensioned ends 22 and small dimensioned ends 24, as indicated on the right-hand connector shown in FIG. 1. The large dimensioned end defines a skirt and the small dimensioned end defines a nose of the connector. The nose includes therewithin a metal sleeve for crimping to exposed conductor cores of multiple insulated wires, to "pigtail" or tie two or more wires together. It should be understood, however, that the delivery system of the invention is not limited in concept to these particular types of connectors and is applicable for other connector configurations, including discrete connector components of an overall electrical connector assembly. With that understanding, processing station 14 is illustrated as a crimping tool, but the processing station could comprise other tools or assembly machines.

As stated above, processing station 14 (FIG. 2) includes a crimping tool which is schematically illustrated at 26. The tool may be a hand-held device and includes an actuator hand lever or trigger 28. The trigger actuates a piston and cylinder device which includes a cylinder 30 and a reciprocal piston 32. The distal end of the piston is connected to a pusher finger 34 which pivots about a pivot point 36 in the direction of arrow "A". The pusher finger includes a tip 34a that forces a connector into jaws within head 35 of the tool where the nose portion 24 of the connector is crimped onto an electrical component such as a wire. In actual practice, one connector will be located in the head and held by a slight interference fit within a collet 38, while a successive connector, identified at "C1", will be awaiting entry into the head, the skirt portion of the successive connector partially overlapping the protruding nose portion of the connector in the head. The connector located in the head is released after crimping, and the connector at "C1" will be forced into the head/collet by way of the pusher finger.

Generally, the invention contemplates delivery means located within delivery conduit 16 for effecting a pressure differential therewithin to create a vacuum to cause movement of connectors "C" in the delivery conduit in a downstream direction from storage container or hopper 12 to processing station or crimping tool 14 regardless of the relative positioning of the storage container or hopper 12 with respect to the processing station 14, i.e. independent of gravitational forces. More particularly, an air jet 40 is located in a recessed area 42 of the delivery conduit. The air jet is connected, as at 44, to a source of high pressure air. The jet directs a stream of high pressure air in the delivery conduit in the downstream direction, as indicated by arrow "B". Therefore, a vacuum is created upstream of the air jet, as generally indicated at 46. In essence, the vacuum sucks connectors "C" in the direction of arrow "D" and forces connectors downstream of the air jet, as indicated by connector "C2" in FIG. 1, toward processing station 14 (FIG. 2).

It should be noted that delivery conduit 16 transversely dimensioned to allow only one connector component to pass therethrough at any given time. With that understanding, the invention, generally, contemplates the provision of feed means, generally designated 48, for feeding connector components through the delivery conduit one component at a time in an incremental fashion. It can be seen in FIG. 1 that feed means 48 is located downstream of hopper 12 and upstream from the air jet delivery means 40.

More particularly, feed means 48 is provided in the form of a selector pawl 50 which is rotatable in the direction of arrow "E" about a pivot axis 52. The selector pawl is rotated by a piston and cylinder device which includes a cylinder 54 and a piston 56 pivotably connected to the selector pawl at 58. The selector pawl includes a first stop 60 and a second stop 62 which are movable into and out of the path of movement of connectors "C" in conduit 16. In the position shown in FIG. 1, stop 60 is illustrated as engaging a lead one of a plurality of the connectors to hold the connectors upstream of air jet 40. When the piston and cylinder device is actuated, piston 56 moves in the direction of arrow "F", causing selector pawl 50 to rotate in the direction of arrow "E". When the selector pawl rotates, stop 60 will move out of the path of the lead connector and allow the connector to be sucked downstream of the conduit by the vacuum created by air jet 40. At the same time, stop 62 will move to block the path of movement of a successive connector. Once a given connector has been allowed to bypass selector pawl 50, the pawl rotates back to the position shown in FIG. 1, either by a positive return action of cylinder 54 on piston 56, or by a spring action. Since stop 60 is downstream of stop 62, upon return rotation of the selector pawl, stop 62 will release the successive connector but stop 60 again will block the path of movement of that connector until another cyclical operation of the piston and cylinder device.

Figure 3:
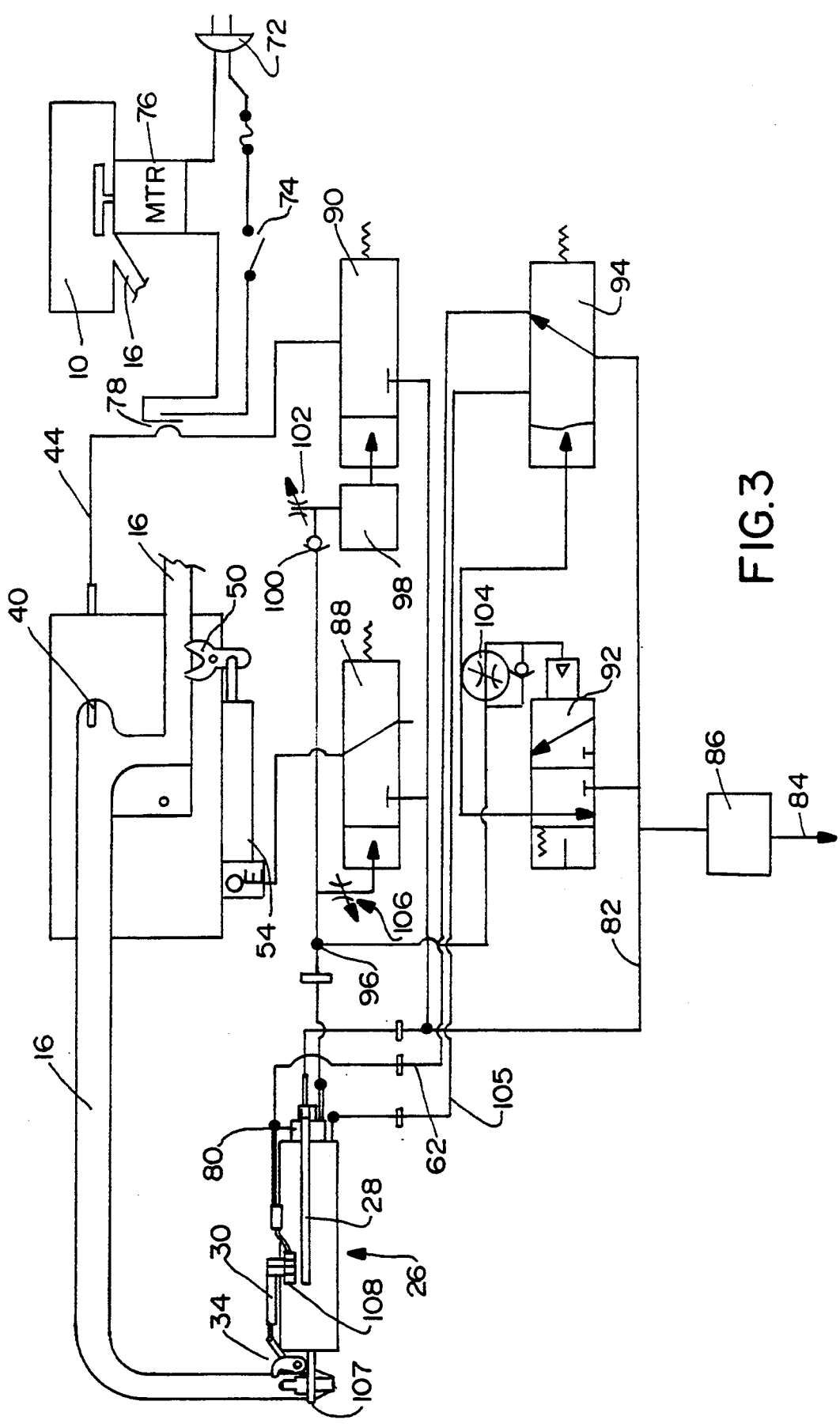
FIG. 3 is a pneumatic/electrical diagram of a system for operating the delivery system of the invention in association with the termination tool.

It is contemplated that selector pawl 50, through piston and cylinder device 54 and 56, be operatively associated with crimping tool 26 at processing station 14, so that, as a connector is crimped and released at the processing station, another connector is delivered by selector pawl 50. This can be accomplished by interconnecting piston and cylinder device 30 and 32 of the crimping tool with the piston and cylinder device 54 and 56 of the selector pawl. Such an interconnection is shown schematically by line 64 in FIGS. 1 and 2, and air lines 81, 82, 96 and 105 in FIG. 3. To control and operate the tool entirely from hand lever 28 requires the four air lines attached to tool 26, as shown in FIG. 3. Alternatively, a foot pedal or other remote device (not shown) may be used to control the tool which would necessitate only two air lines attached to tool 26.

Figure 4:
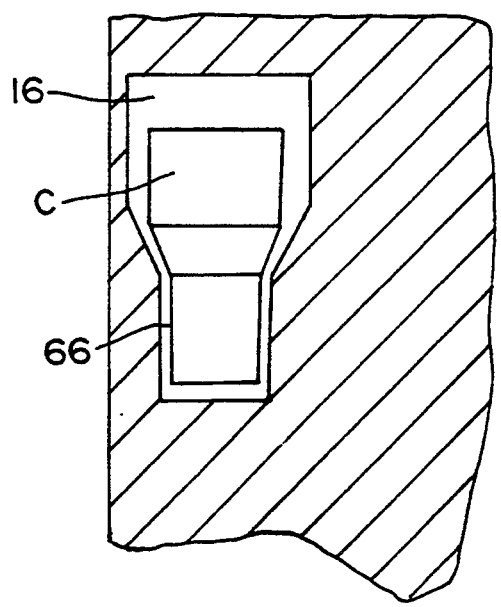
FIG. 4 is a fragmented sectional view taken generally along lines 4—4 in FIG. 1 showing the orientation track of the delivery system.

The invention also contemplates orientation means associated with the delivery means for effecting delivery of connectors "C" to processing station 14 in a predetermined orientation. For instance, as stated above, each connector "C" has a skirt or large dimensioned end 22 and a nose or small dimensioned end 24. Since the nose is to be crimped onto an electrical wire, it is desirable to have the skirt of any given connector move into the processing station or crimping tool ahead of the nose. Consequently, an orientation track 66 is shown in FIG. 1 immediately upstream of air jet 40. The orientation track extends alongside a section of the conduit in communication therewith. In essence, the orientation track comprises a slot or groove of a smaller transverse dimension than that of the conduit. The transverse dimension of the track is larger than the small dimensioned ends 24 of the connectors and smaller than the large dimensioned ends 22 of the connectors, shown in FIG. 4.

Therefore, as any given connector is released by selector pawl 50 for movement down delivery conduit 16 in the direction of arrow "D" if the skirt end of the connector is the lead end, the connector will be drawn by the suction created by air jet 40 past orientation track 66 down the conduit toward the processing station, because the large dimensioned skirt of the connector cannot enter the orientation track. However, if a given connector is released by the selector pawl with its leading end being the nose or small dimensioned end of the connector, the nose will move into orientation track 66 and the suction will "flip" the skirt or large dimensioned end of the connector toward the air jet and down the delivery conduit toward the processing station in a skirt-first orientation. It should be noted that orientation track 66 is conveniently located at a bend in the delivery conduit in a leading wall 68 thereof, to facilitate entry of the nose portions of the connectors into the orientation track by momentum or centrifugal force.

Lastly, a small orifice passage or air channel 70 is provided through the housing of the system to communicate orientation track 66 with the delivery conduit downstream of air jet 40. This orifice relieves air build-up within the orientation track to provide a better air flow and to facilitate movement of the small dimensioned nose portions of the connectors into the orientation track.

FIG. 3 schematically illustrates, in diagram form, an exemplary system for operatively interconnecting the delivery system of the invention (FIG. 1) and the termination or crimping tool (FIG. 2). In essence, the system of FIG. 3 includes the interconnection shown schematically by lines 64 in FIGS. 1 and 2, along with delivery conduit 16.

More particularly, referring to FIG. 3, initially, a supply of connectors "C" is loaded into hopper 12 (FIG. 1). A power plug 72 is plugged into a power source. A normally open power switch 74 is closed. At this point, the electrical circuit is still open, and an agitator motor 76 (coupled to agitator 20) is not yet energized, due to a normally open pressure/power switch 78. A manually operated 3-way valve 80 is located on crimping tool 26 such that air in a line 82 is connected to an air source 84 through a filter regulator gauge 86.

A pair of 3-way valves 88 and 90 are closed as is 3-way delay valve 92. 4-way valve 94, which transmits air to tool 26 through line 81 during the time the tool is not crimping and through line 105 during crimping, is shown in the deactivated position, i.e. attached to line 81.

An operator pushes hand lever 28 to actuate 3-way valve 80 and communicate a signal (or line air) from air line 82 through air line 96 to delay valve 92, 3-way valve 88 and a volume tank 98, through a check valve 100. That first signal of air through volume tank 98 is trapped in the volume tank by check valve 100 causing 3-way valve 90 to turn on and remain on until the trapped air can bleed through needle valve 102. Normally this bleed time is set for a preselected amount of time between 1 and 15 minutes. During this time, power/pressure switch 78 is turned on and air rushes through air jet 40. This configuration allows the crimping action of the tool to activate the tool for the preselected amount of time as set by needle valve 102, thus allowing the first crimp to turn the tool on and the last crimp to turn the tool off automatically and remotely after the preselected amount of time has elapsed.

All actuations of hand lever 28 also send air through air line 96 to 3-way delay valve 92 which responds to each actuation of the hand lever 28, through the cylinder return airline 81, to turn 4-way valve 94 on and off in a time dependent on the setting of external knob adjustment 104. Such a configuration allows the cycle time to be constant and not dependent on the amount of time hand lever 28 is held, thus giving the system a full cycle control of the connector crimp.

3-way delay valve 92 is piloted by each single crimp, through air line 96, as is 3-way valve 88, which, when controlled by needle valve 106, gives a slightly delayed shot of air to selector pawl cylinder 54 which, in turn, actuates selector pawl 50 and releases a connector into the vacuum side of the delivery conduit. The connector will then have a known "flight time" to the crimping tool to arrive in time for pusher finger 34 to move between an open and closed position (as set by 3-way delay valve knob 104). This action pushes the crimped connector out of jaws 107 of the crimping tool and the just-arrived connector into collet 38 which locates and holds this connector during crimping.

Two self-clearing functions are incorporated into crimping tool 26. First, a sleeve valve 108, when turned off, allows the crimping member to release any jammed part at the jaws 107. Second, the delivery conduit 16 (FIG. 2) can be removed at a fitting (not shown) entering head 35. Once removed, the conduit can be blocked for a few seconds by an object such as an operator's finger or the like. This action will reverse the pressure at air jet 40, changing the direction of the air jet stream to a direction opposite arrow "B" as shown in FIG. 1, to break up most jams and dislodge any defective parts upstream of jet 40.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A connector delivery system for delivering an electrical connector component from a storage container to a processing station spaced from said storage container by a given distance, the storage container containing a plurality of connector components each having a large dimensioned end and a small dimensioned end, the connector delivery system comprising:

a substantially entirely enclosed delivery conduit extending substantially the entire given distance from the storage container to the processing station, and being transversely dimensioned to generally correspond to said large dimensioned end of each of the connector components to allow one of the plurality of connector components to pass therethrough at a given time;

delivery means for effecting a pressure differential within the delivery conduit which creates a high pressure air current on one side of the delivery means to deliver the connector components to the processing station, and a vacuum on the other side of the delivery means to draw the connector components from the storage container into the conduit, wherein the delivery means moves the connector components from the storage container through the delivery conduit in a downstream direction to the processing station independent of gravitational forces;

feed means for allowing one of the plurality of connector components through the conduit at a given time while blocking a successive one of the plurality of connector components;

orientation means extending along a portion of the conduit for effecting delivery of the connector components to the processing station in a predetermined orientation, the orientation means being defined by an orientation track having a slot which is larger than the small dimensioned end of the connector components and smaller than the large dimensioned end of the connector components, so that when the small dimensioned end of one of the connector components enters the track ahead of said large dimensioned end, said small dimensioned end enters the slot exposing the large dimensioned end of the connector component within the conduit, and the vacuum is effective to draw the large dimensioned end of the connector component downstream through the conduit ahead of the small dimensioned end; and actuating means for actuating said feed means, said actuating means being operatively associated with a tool at said processing station for cyclically actuating the feed means in response to operation of the tool.

2. A connector delivery system as set forth in claim 1, wherein said feed means comprises a single selector pawl having a first stop and a second stop movable into and out of the path of each of the connector components as they pass through the conduit.

3. A connector delivery system as set forth in claim 1, wherein said orientation means effects orientation of the connector components independent of gravitational forces.

4. A connector delivery system as set forth in claim 1, wherein said delivery means comprise a single air jet located along said delivery conduit between said storage container and said processing station and wherein said air let is the sole means of effecting delivery of the connector components from the storage container to the processing station.

5. A connector delivery system as set forth in claim 4, wherein said delivery conduit includes a first conduit portion on the high pressure side of the delivery means, a second conduit portion on the vacuum side of the delivery means and generally parallel to the first conduit portion, and a transverse connecting portion between the first and second conduit portions, the orientation means being located generally along said transverse connecting portion.

6. A connector delivery system as set forth in claim 5, wherein the transverse connecting portion is generally perpendicular to the first and second conduit portions.

7. A connector delivery system as set forth in claim 5, wherein the air jet is generally in-line with the first conduit portion and is positioned within a recess in an area defined by the intersection of the first conduit portion and the transverse connecting portion.

8. A connector delivery system as set forth in claim 1, wherein said orientation track is located upstream of said delivery means.

9. A connector delivery system as set forth in claim 1, wherein said feed means are located upstream of said delivery means.

10. A connector delivery system as set forth in claim 1, wherein said feed means are located upstream of said orientation means.

11. A connector delivery systems set forth in claim 1, wherein said orientation means effects delivery of the connector components to the processing station with the large dimensioned end leading the small dimensioned end and wherein said processing station comprises a crimping tool and said large dimensioned end of each of said connector components is adapted to be crimped onto a stripped end of an insulated wire.

12. A connector delivery system for the transfer of an electrical connector component and defining a path of movement thereof, the connector delivery system comprising:

a storage container at the origin of the path of movement of the connector component and containing a plurality of said connector components, said storage container having an opening therein to allow one of the electrical connector components to pass therethrough and a mechanical agitator which overlies said opening;

a crimping station at the end of the path of movement of the connector component for receiving and crimping one of the connector components onto the end of an electrical wire;

a substantially entirely enclosed delivery conduit extending substantially entirely along the path of movement between the storage container and the crimping station, said delivery conduit transversely dimensioned to generally correspond to one of the connector components to allow one of said connector components to pass therethrough at a given time;

an air jet for effecting a pressure differential within the delivery conduit, creating a high pressure air current on one side of the air jet to deliver the connector components to the crimping station, and creating a vacuum on the other side of the air jet to draw the connector components from the storage container into the conduit, wherein the air jet moves the connector components from the storage container through the delivery conduit to the crimping station independent of gravitational forces;

a selector pawl movable into and out of the path of each of the connector components as they pass through the conduit and having a first stop and a second stop for allowing one of the plurality of connector components to pass through the conduit at a given time; and an orientation track extending along a portion of the conduit for effecting delivery of the connector components to the crimping station in a predetermined orientation.

13. A connector delivery system as set forth in claim 12 further comprising a manual actuator for actuating said selector pawl, said actuator being operatively associated with the a crimping tool at the crimping station for cyclically actuating the selector pawl in response to operation of the tool.

14. A connector delivery system as set forth in claim 12, wherein each of said connector components has a large dimensioned end and a small dimensioned end, and wherein said orientation track includes a slot which is larger than the small dimensioned end of the connector components and smaller than the large dimensioned end of the connector components, whereby when the small dimensioned end of one of the connector components enters the track ahead of said large dimensioned end, said small dimensioned end enters the slot exposing the large dimensioned end of the connector component within the conduit, and the vacuum is effective to draw the large dimensioned end of the connector component downstream through the conduit ahead of the small dimensioned end.

* * * * *